United States Patent [19]

Block

[11] Patent Number: 4,853,434

[45] Date of Patent: Aug. 1, 1989

[54] MODIFIED THERMOSETTING RESIN, A METHOD FOR ITS PRODUCTION AND ITS USE

[75] Inventor: Hermann Block, Echem, Fed. Rep. of Germany

[73] Assignee: Hanse Chemie GmbH, Fed. Rep. of Germany

[21] Appl. No.: 103,760

[22] Filed: Oct. 2, 1987

[30] Foreign Application Priority Data

Oct. 7, 1986 [DE] Fed. Rep. of Germany ....... 3634084

[51] Int. Cl.$^4$ ................................................. C08F 8/00
[52] U.S. Cl. ..................................... 525/100; 525/410; 525/422; 525/446; 525/453; 525/476; 525/477; 525/478; 525/479; 525/474
[58] Field of Search ............... 525/100, 422, 410, 453, 525/446, 476, 477, 478, 479, 474

[56] References Cited

U.S. PATENT DOCUMENTS

| | | | |
|---|---|---|---|
| 4,369,289 | 1/1983 | Keogh | 525/100 |
| 4,594,134 | 6/1986 | Hanada et al. | 525/476 |
| 4,725,648 | 2/1988 | Fujimoto et al. | 525/100 |

FOREIGN PATENT DOCUMENTS 0146803 3/1985 European Pat. Off. .

*Primary Examiner*—Melvyn I. Marquis
*Attorney, Agent, or Firm*—Roylance, Abrams, Berdo & Goodman

[57] ABSTRACT

There is disclosed a modified reaction resin with a content of 50 to 98% by weight of a liquid reaction resin or reaction resin mixture processed into thermosetting plastic with a suitable reactive group of sufficient number for the hardening process and 2 to 50% by weight of one or more three-dimensional crosslinked polyorganosiloxane rubbers, which are held in the reaction resin matrix in finely divided state as polyorganosiloxane rubber particles with a diameter of from 0.01 to 50 micrometers, together with small quantities of other auxiliary materials. The rubber particles have reactive groups on their surfaces, which in turn in the presence of auxiliary media serving as reactive components can react chemically with the reaction resin.

There is also disclosed a process for the production of the modified reaction resins and their use for the production of fracture and impact resistant, also definitively shaped thermosetting plastics, fiber-reinforced plastics, insulation materials and laminated plastic.

21 Claims, No Drawings

MODIFIED THERMOSETTING RESIN, A METHOD FOR ITS PRODUCTION AND ITS USE

BACKGROUND OF THE INVENTION

The invention relates to a modified reaction resin, a process for its production and also its use for the production of shaped thermosetting plastics with improved fracture resistance, especially impact resistance.

Starting products or prepolymers which are to be understood as addressed in the scope of the present invention are from among the reaction resins which are liquid or plastic before and during the processing and shaping process and following the traditional shaping processing, as a result of polyreaction (polymerization, polycondensation, polyaddition), yield thermosetting plastics. A three-dimensional, crosslinked, hard, non-melting resin, the thermosetting plastic, is obtained by the polyreaction, and the thermosetting plastic thus differs basically from traditional thermoplastic plastics, which as is known can be liquified and/or plasticized repeatedly by reheating.

As a result of the generally very high density of crosslinking, the crosslinked reaction resins have a number of valuable properties, which provide the reason that they, along with the thermoplastics, are the most used polymers. These valuable properties especially include hardness, strength, chemical resistance and temperature durability. Because of these properties, these reaction resins are used for various purposes, for instance for the production of fiber-reinforced plastics, for insulation materials used in electrotechnology, for the production of structural adhesives, laminated plastics, annealing lacquers and the like.

In addition to these advantageous properties, the thermosetting plastics have one serious drawback, which in many cases quite prevents their use. As a result of the highly crosslinked state, they are very brittle and have a low impact resistance. This appears especially in the range of low temperatures, in other words at temperatures below 0° C., so that, for uses wherein the polymer is to be subjected to high mechanical stresses at low temperatures, especially impact stresses, the thermoplastic polymers generally have the advantage, whereby the drawbacks connected therewith, such as lower heat deformation resistance and chemical resistance, must be taken into consideration.

Since this condition is not particularly favorable, there have been many attempts in the past to improve the impact resistance or flexibility of thermosetting plastics.

Thus, it is already known, for instance, to mix reaction resins with fiber fillers, in order to increase the impact resistance. The improvements which are thus obtained are nonetheless quite limited. The addition to resins of powdered, soft filler material, such as powdered rubber or soft elastic plastic powder, is also known. The particle dimensions of such powdered additives is in the range of approximately 0.04 to 1 mm, which obviously does not suffice to improve such reaction resins to the desired degree, and which therefore enhance the drawbacks relative to other important properties required for technical use of this sort of modified thermosetting plastic.

Attempts have been made to improve the impact resistance of crosslinked reaction resins by addition of softeners. The added softeners do not react with the reaction resin, but rather as a result of layering cause a widening of the network of thermosetting plastics and with that a certain softening of the material. A remarkable improvement of the impact resistance can actually be attained in this manner, which however unfortunately results in a limitation of the outlay which is required for the quality of other essential features of the thermosetting plastics. Therefore, with the use of softeners, a latent danger exists of migration occurring following the crosslinking of the reaction resin or with further aging, with the negative results inherent therein for the surface properties of the material, such as the adherence, spreadability, polish and the like.

Furthermore, attempts have also been made to increase the elasticity of thermosetting plastics, in that chain lengtheners are added, which are incorporated into the network with the hardening process and lower the density of crosslinking. Epoxy resins for instance could be elasticized according to this principle by addition of epoxidized soybean oil, dimeric fatty acids or epoxy-functional polyglycol ethers. Since the improvement in elasticity, however, is attained by a decrease, of the crosslinking density, it is connected with the decreasing crosslinking density a deterioration of desirable properties, such as hardness, chemical resistance or temperature durability. This solution therefore also led to results which were not totally satisfactory.

It is also known to use liquid or solid, but uncrosslinked butadiene-acrylonitrile rubbers (nitrile rubber, NBR) as additives to improve the viscosity of the reaction resins. These nitrile rubbers contain functional groups which can be reacted with the reaction resin with the crosslinking process or even in a previous reaction. The remarkable feature of these modifiers as compared with those cited as being used until now resides in that they are actually miscible with the un-crosslinked reaction resin, and a phase separation nonetheless takes place during the crosslinking of the reaction resin, in which the rubber phase is deposited in the form of fine droplets. As a result of the reaction of the functional groups located on the surface of the nitrile rubber particles with the reaction resin, a solid connection of the rubber phase with the thermosetting plastic matrix is formed.

This type of modification of reaction resins is actually more advantageous because the effect is attained not by simply lowering the network density, but rather by formation of a separate soft phase with the result that the other advantageous properties of the thermosetting plastics are not influenced quantitatively by the modifier, as is the case with the measures which were formerly used. Unfortunately, however, such thermosetting plastics modified with nitrile rubber have notable problems. For instance, the heat resistance of thermosetting plastics modified with nitrile rubber is notably decreased and because of that their capacity for use at high temperatures is questionable. This is also true of many electric properties, such as for example the dielectric strength or breakdown resistance. Because of the relatively good compatibility of the nitrile rubber with most reaction resins, especially with epoxy resins, a certain portion of the rubber does not participate in the phase separation during the crosslinking and is incorporated into the resin matrix. The density of crosslinking of the crosslinked reaction resin is thereby lowered with the already noted negative results for the configuration of the properties of the completed thermosetting plastics. Another drawback is the very high viscosity of the nitrile-rubber modifiers, which leads to processing problems and which negatively influences the flow properties of the modified reaction resin.

SUMMARY OF THE INVENTION

The object of the present invention is to modify reaction resins in such a manner that thermosetting plastics are obtained with improved fracture resistance following the shaping and hardening process, and which have especially improved impact resistance, and the advantageous properties inherent in the thermosetting plastics, especially their heat deflection temperature their strength and chemical resistance, still inherent almost completely, even in thermosetting plastics which are modified in such a manner.

This is attained according to the invention by a modified reaction resin which is characterized by the following component contents:

(a) 50-98% by weight of a reaction resin or reaction resin mixture which is processed into thermosetting plastics, is liquid at temperatures in the range of from 18 to 120°C., with an average molecular weight of from 200 to 500,000 and with a number of suitably reactive groups sufficient for the hardening process, and (b) 2-50% by weight of one or more three-dimensional crosslinked polyorganosiloxane rubbers, which are contained in the reaction resin mixture in finely divided state as polyorganosiloxane-rubber particles with a diameter of from 0.01 to 50 micrometers, in which the rubber particles have reactive groups on their surfaces, which, in case they are in the presence of auxiliary agents serving as reactive component, before or during the further processing of the modified reaction resin, for instance during the shaping process and the hardening process, react chemically with the reaction resin, if they are together with small quantities of auxiliary materials, especially crosslinking agents, catalysts, dispersants and/or hardening agents.

The modified reaction resin according to the invention preferably contains 5 to 30% by weight of one or more three-dimensional crosslinked polyorganosiloxane rubbers.

DETAILED DESCRIPTION OF THE INVENTION

Reaction resins modified with polysiloxanes which differ from the reaction resins modified according to the invention are already known. German Auslegeschrift No. 11 78 540 discloses mixed condensation products which are soluble in organic solvents and are of organopolysiloxanes containing silicon-bonded hydroxyl groups and not oil-modified polyesters, which are to be used as heat-resistant annealing lacquers. In this case, accordingly, homopolymeric or copolymeric siloxane resins are used and not polyorganosiloxane rubbers, as with the reaction resin modified according to the invention. Also, the goal is different, since improvement of its strength at high temperatures rather than improvement of its impact resistance is sought for the annealing lacquers. Other examples in which other properties, e.g., the aging resistance or electric properties, are to be improved by addition of siloxane resins to reaction resins, are disclosed in the monograph of W. Noll, "Chemie und Technologie der Silicone", Weinheim 1968, especially in Chapter 7.4.

Polysiloxane modifiers of thermoplastic vinyl polymers, polyesters, polycarbonates, polyphenylene sulfides and a series of other thermoplastic materials are known from German Offenlegungschriften Nos. 27 17 227, 32 05 993 and 33 44 911. The polysiloxanes used in these specifications, however, generally have to do with other than three-dimensional crosslinked polyorganosiloxane rubbers, and also mixtures which are described in the cited specifications are specifically limited to thermoplastic polymers, and therefore include no reaction resins of the type treated in the present invention.

Furthermore, siloxane-modified novolaks are disclosed in German Offenlegungsschrift 29 00 185. This specification relates to linear polysiloxane-novolak-copolymers, which are hardened as such, without anticipation of any separate phase of finely divided polyorganosiloxane rubber or even of its existence.

Finally, the modification of epoxy resins with polyorganosiloxanes is known from Adv. Polym. Sci. 72 (1985), pages 80 to 108, which discloses the hardening process of the epoxy resin in a similar manner as was described beforehand for the nitrile rubber modifiers, and coalescing in the form of finely divided droplets. In this case, it has to do with an emulsion of liquid, uncrosslinked polyorganosiloxanes in the reaction resin and not with solid, three-dimensional crosslinked polyorganosiloxane rubbers, which are found in finely divided state in the reaction resin.

None of the cited specifications then shows any anticipation of the products according to the invention or any basis of the invention by which a person in the art could anticipate the disclosure of the invention.

Rather, it was surprising that it was discovered that as a result of the composition suggested according to the invention, a modified reaction resin is obtained which yields a thermosetting plastic as a result of the final, known, shaping treatment and hardening, which has a remarkably improved material toughness or fracture resistance, especially impact resistance, as compared with thermosetting plastics which are not modified or are not modified in the same manner, while the other properties which are advantageous in thermosetting plastics, such as temperature stability, strength and chemical resistance, are not negatively influenced or are only very slightly influenced.

All polymeric or oligomeric organic compositions which have a sufficient number of reactive groups which are suitable for a hardening reaction are suitable as reaction resins according to the invention. Thus, for the purpose of the invention, it is of little importance which crosslinking or hardening mechanism is actually used. Therefore, any reaction resin which can be processed into a thermosetting plastic, independent of any crosslinking mechanism which starts with the hardening of the relevant reaction resin, is generally suitable as a starting product for the production of the reaction resins modified according to the invention.

Reaction resins which can be used as starting products according to the invention can basically be divided into three groups corresponding to the type of crosslinking, occurring as a result of addition, condensation or polymerization.

The first group of reaction resins are those crosslinked by polyaddition. One or more epoxy resins, urethane resins and/or air-drying alkyd resins are preferred as the starting material. Epoxy and urethane resins are generally crosslinked by addition of stoichiometric quantities of a hardener containing hydroxyl-, amino-, carboxyl- or carbonic acid anhydride groups, and the hardening reaction occurs by addition of the oxirane and/or isocyanate groups of the resin to the corresponding groups of the hardener. When epoxy resins are used, the catalytic hardening is even possible by polyaddition of the oxirane groups. Air-drying alkyd resins crosslink by autooxidation with the oxygen of air.

Examples of the second group of reaction resins crosslinked by polycondensation are condensation products of aldehydes, including formaldehyde, with aliphatic and aromatic compounds containing amine groups, including urea or melamine, or with aromatic compounds such as phenol, resorcinol, xylene and so forth, or furan resins, saturated polyester resins and silicone resins. The hardening then generally occurs by increased temperature along with elimination of water, low molecular alcohols or other low molecular compounds. One or ore phenol resins, resorcinol resins and/or cresol resins are preferred as starting material for the reaction resins modified according to the invention, or even resols and also novolaks, and also urea-, formaldehyde- and melamine-formaldehyde-precondensates, furan resins and also saturated polyester resins and/or silicone resins.

From the third group of reaction resins crosslinked by polymerization, one or more homopolymers or copolymers of acrylic acid and/or methacrylic acid or their esters, and furthermore unsaturated polyester resins, vinyl ester resins and/or maleinimide resins are preferred as starting resins for the reaction resins modified according to the invention. These resins have double bonds which can be polymerized, and said polymerization or copolymerization causes the three-dimensional crosslinking. Compounds which are qualified for the formation of free radicals, e.g., compounds containing peroxides, peroxide compounds or azo groups serve as starters for the formation of free radicals. An initiation of the crosslinking reaction is also possible by high energy radiation, such as UV or electron radiation.

Not only the aforementioned reaction resins, but also all others which are suitable for the production of thermosetting plastics can be modified in the manner suggested by the invention and following crosslinking and hardening yield thermosetting plastics with greatly improved fracture and impact resistance, and other essential properties which are characteristic for the thermosetting plastics, such as strength, shape durability in heat and chemical resistance, still remain essentially undisturbed. In this case, it makes no difference whether the reaction resins are solid or liquid at room temperature. Even the molecular weight of the reaction resin is practically without consequence; the reaction resins with an average molecular weight in the range of from 200 to 500,000 could generally be used; the reaction resin or resin mixture generally has an average molecular weight of from 300 to 20,000.

With the selection of suitable polyorganosiloxane rubbers for the purpose of the invention, it is important that they are three-dimensional crosslinked rubbers with sufficient elasticity, which are distributed in the liquid reaction resin and have a particle diameter of from 0.01 to 50 micrometers, preferably a particle diameter in the range of from 0.05 to 20 micrometers and especially preferably from 0.1 to 5 micrometers, and which have reactive groups on the surface, so that they can be chemically bonded to the reactioh resih. Polyorganosiloxanes, which fulfill these conditions and form rubber-elastic polymers with the crosslinking, are generally suitable for the purpose of the invention.

Of the plurality of various three-dimensional crosslinked polyorganosiloxane rubbers, those are preferred which are of the following general formula of siloxane units:

$$-(R_2SiO)- \qquad (1)$$

in which both monovalent R radicals, which can be identical or different, can be linear or branched alkyl groups with 1 to 18 C atoms, cycloaliphatic groups with 4 to 8 C atoms, linear or branched alkenyl groups with 2 to 4 C atoms, phenyl or alkylphenyl groups with 1 to 12 C atoms in the aliphatic radical, and the hydrocarbon radicals can also be substituted by halogen or hydroxyl-, carboxyl-, carboxcylic acid anhydride-, amino-, epoxy-, alkoxy- or alkenyl oxy groups, and furthermore represent polyether- or polyolefine groups as well as hydrogen, and the groups are connected directly or else through an oxygen or nitrogen atom with a silicon atom of the polysiloxane chain.

Examples of such R radicals are methyl-, ethyl-, isopropyl-, isobutyl-, dodecyl- and octadecyl groups, cyclopentyl-, cyclohexyl- and cyclooctyl groups, vinyl-, allyl-, isopropenyl- and 3-butenyl groups, ethylphenyl-, dodecyl groups, and other groups with hydrocarbon radicals, which are partially substituted, for example by halogens, such as fluorine or chlorine, as found for instance in chloropropyl- or in the 1,1,1-trifluoropropyl radical. At least a portion of the R radical can also consist of polymer groups, especially including polyethers, such as polyethylene-, polypropylene-, polybutylene- or polyhexamethylene glycol or polytetrahydrofuran and also copolymers of these ethers, and also polyolefines, e.g., polybutadiene, polyisoprene, polybutene, polyisobutene and the like. Finally, a part of the R radical can also be hydrogen.

Of course, it is also possible to use mixtures of the cited polyorganosiloxanes.

Furthermore, it is also possible to use said polyorganosiloxanes according to the invention, in which are present different R radicals in the polymer molecule. These different radicals could be distributed randomly along the siloxane main chain. In one preferred embodiment, the polyorganosiloxane rubber used according to the invention is a block copolymer, in which monovalent R' and R'' radicals are arranged in blocks along the siloxane main chain, which are of the following general formula of polymer units:

$$-(R'_2SiO)_x-(R''_2SiO)_y- \qquad (2)$$

in which the R' and R'' radicals, which have the same meaning as previously defined for R, are different from each other, while the R' and R'' radicals can be identical to each other or different, and x and y are the same as 1 or some whole number multiple thereof.

On account of their easy availability and good effect, those polyorganosiloxanes are preferred, in which at least 50% of the R, R' and R'' radicals represent methyl- and/or phenyl groups.

The invention also relates to a process for the production of modified reaction resins, which is characterized in that:

(a) a dispersion is produced of from 2 to 50% by weight, preferably from 5 to 30% by weight, of one or more three-dimensional crosslinking, liquid polyorganosiloxanes with an average molecular weight of from 800 to 500,000, which are insoluble or are only slightly soluble in the reaction resins to be modified, and if so together with slight quantities of auxiliary materials, especially crosslinking agents, catalysts, dispersants and/or hardening agents, in 50-98 percent by weight of a liquid reaction resin or reaction resin mixture with an average molecular weight of from 200-500,000 which is liquid at temperatures in the range of from 18-120°C. and which can be processed into thermosetting plastics, in which the polyorganosiloxane droplets are present with a diameter in the range of from 0.01 to 50 micrometers, (b) a crosslinking in the polysiloxane droplets is carried out under suitable reaction conditions, in which no hardening reaction or only a slight hardening reaction takes place in the reaction resin itself, and (c) a chemical reaction between the polyorganosiloxane particles and the reaction resin or reaction resin mixture is carried out, causing a chemical bond between the polyorganosiloxane particles and the reaction resin or resin mixture and with participation of reactive groups which are present in the polyorganosiloxane particles themselves or optional additives contained therein.

A dispersion is produced, preferably in stage (a), with use of a reaction resin or reaction resin mixture which is liquid at temperatures of from 20 to 100° C.

Because of a better manipulability and easier accessibility, uncrosslinked polyorganosiloxane or polyorganosiloxane mixtures are preferably used in stage (a), which have an average molecular weight of from 1,000 to 100,000, especially preferably from 1,200 to 30,000.

In the process according to the invention, the uncrosslinked liquid polysiloxanes which are used in the reaction resins are finely divided, so that the polysiloxanes are present in the reaction resin matrix as droplets with diameters in the range of from 0.01 to 50 micrometers, preferably from 0.05 to 20 micrometers and especially preferably from 0.01 to 5 micrometers.

The process according to the invention can be carried out in different embodiments. One preferred embodiment resides in that the liquid polyorganosiloxane is first of all dispersed in a medium which is not miscible or is only slightly miscible with polyorganosiloxanes and then they are crosslinked in a known manner, before they are thoroughly mixed with the reaction resin or reaction resin mixture to be modified, and the dispersant medium may be removed in a known manner after the mixing. Water is preferably used as the dispersant.

With this embodiment of the process according to the invention then first a dispersion of the uncrosslinked, liquid polyorganosiloxane is produced in a special dispersant, and the crosslinking occurs in the polyorganosiloxane droplets, e.g., by suitable increase of the temperature, and the crosslinked polyorganosiloxane-rubber particles which are formed in the dispersant medium remain dispersed as is desired. In another process step, this dispersion is mixed with the reaction resin to be modified, and care must be taken to maintain the fine distribution. If the dispersant medium is not desired in the modified reaction resin mixture, it can be separated out by evaporation or decanting.

The chemical reaction in stage (c) of the process according to the invention occurs advantageously before or during the later processing of the modified reaction resin.

In another and especially preferred embodiment of the process according to the invention, the uncrosslinked liquid polyorganosiloxanes are dispersed and crosslinked directly in the liquid reaction resin or reaction resin mixture. Likewise in another preferred embodiment, the chemical reaction in stage (c) of the process according to the invention can be carried out in one step together with the dispersion and crosslinking of the liquid polyorganosiloxane in the reaction resin or reaction resin mixture.

These embodiments of the process according to the invention which are especially simple to execute are actually most suitable for all of the aforementioned polyorganosiloxanes. The results, however, are especially favorable when the uncrosslinked liquid polyorganosiloxanes which are used are insoluble or are only slightly soluble in the reaction resin or reaction resin mixture. This prerequisite is true for practically all of the reaction resins, when at least a major part, preferably more than 50%, of all organic groups of the siloxane main chain are methyl groups, and such polyorganosiloxane are preferably used for these variations of the process according to the invention.

The fine distribution of the liquid polyorganosiloxane in the liquid reaction resins can be implemented with all known measures and auxiliary means used for the production of emulsions. Among these are counted especially mechanical assemblies which display a quite high shear effect in the medium to be dispersed such as for example stirrers, dissolvers, kneaders, roller frames, high pressure homogenizers, ultrasonic homogenizers and the like. To obtain a fine distribution, dispersing devices of the "Ultra-Turrax" type are especially suitable. It is to be understood that the shearing forces to be applied for the production of a certain distribution are dependent upon the viscosities of the polysiloxanes and of the reaction resin or reaction resin mixture. With very high viscosities, especially of the reaction resin, then such high shearing forces must be applied under some conditions that either correspondingly powerful dispersing machines must be used or else the viscosity must be lowered by corresponding increase of the temperature. This is especially true for reaction resins which are solid at room temperature and are not to be brought into plastic or fluid state until the temperature is raised. The increased temperatures which are used, however, may not lead to any notable crosslinking of the polyorganosiloxanes or of the reaction resins during the dispersion phase. This can be controlled in a known manner by suitable selection of the crosslinking system.

In order to attain the desirable particle dimensions with dispersion of the polyorganosiloxanes and/or to stabilize the polyorganosiloxane dispersion which has been attained, it can be necessary or be desirable to use certain additives with a dispersant effect. In the cases in which the siloxane component itself has a sufficient dispersability as a result of suitable selection of a part of the R, R' or R" radical, and the radicals generally have a chemical constitution which is compatible with the relevant reaction resin, dispersant additives can be dispensed with. In all other cases, however, in which such substituted polysiloxanes are either not available or are produced only at high cost, use of a separate dispersant can be required. Preferably, therefore, compounds with amphiphilic structures are used as dispersants in stage (a), and a portion of the groups of such amphiphilic molecules are selected to be compatible with the polyorganosiloxanes which are used, while another portion of the group is selected to be compatible with the reaction resin or reaction resin mixture.

The suitable dispersant then includes an amphiphilic structure which is analogous to certain emulsifiers. Especially proven and therefore especially to be recommended as dispersants are copolymers with a polyorganosiloxane part and an organic carbon part, which is compatible with the reaction resin or reaction resin mixture. For example, if the reaction resin is an epoxy resin, then a copolymer of polydimethylsiloxane and epoxy resin is a suitable dispersant. The production of such copolymers is generally known and has been described in W. Noll, "Chemie und Technologie der Silikone", Weinheim 1968.

The suitable dispersants for the purpose of the invention can be of any molecular weight, i.e., the molecular weight can vary within a wide range. Dispersants are preferable which have an average molecular weight of from 300 to 50,000. In any case, then, it is essential that the dispersant which is selected is present in the phase boundry layer between polyorganosiloxane and reaction resin under the conditioins of the dispersing process. The required concentration of dispersant depends for the most part upon its effectiveness, the chemical constitution of the polysiloxane and reaction resins and the dispersing conditions. In practice, concentrations of from 1 to 30%, as compared with the polysiloxane portion, have produced good results.

The average molecular weight of the liquid, uncrosslinked polyorganosiloxanes which can be used in the process according to the invention can vary within wide limits and generally lies in the range of from 800 to 500,000. The bottom limit is thus set so that with decreasing molecular weight, the density of the crosslinking of the polyorganosiloxane rubber is greater and thus its elasticity is lower. This effect can be lessened by addition of bifunctional crosslinking agents within certain limits. The top limit is provided by the increasing viscosity of the polyorganosiloxanes, which makes the desired fine distribution of the siloxanes in the liquid reaction resins more difficult. In one preferred embodiment of the process according to the invention, the uncrosslinked polyorganosiloxane or polyorganosiloxane mixture used in stage (a) preferably has an average molecular weight in the range of from 1,000 to 100,000, especially preferably from 1,200 to 30,000. In this case, it is natural to note that the polyorganosiloxanes as well as most other polymers have no uniform molecular weight, but rather a more or less broad molecular weight distribution.

Also, the type of crosslinking by which the liquid polyorganosiloxanes are converted into elastic silicone rubber particles is unimportant for the disclosure of the invention, insofar as it is guaranteed that the size distribution of the polysiloxane particles is not greatly disturbed by the crosslinking reaction and that no or only slight crosslinking reactions take place in the reaction resin phase. Insofar as these prerequisites are fulfilled, all traditionally used hardening processes can be used for the crosslinking of polysiloxane elastomers, especially the known addition and condensation processes.

For implementation of the addition crosslinking, groups must be present in sufficient number in the polyorganosiloxane mixture which have hydrogen bound directly to silicon, i.e., SiH groups, as well as olefinic unsaturated radicals, which can be added to the SiH groups (called a hydrosilylation reaction). In the simplest case in the crosslinked polyorganosiloxanes it has to do with a polydimethyl siloxane with vinyl end groups to which are added 1 to 10% of a polymethyl hydrogen siloxane as a cross-linking agent. The addition crosslinking takes place mostly at high temperatures, for instance between 60 and 140° C., in the presence of a noble metal catalyst. For this purpose, compounds of elements of the platinum groups of the Periodic Table are generally used, usually platinum, palladium or rhodium. One catalyst which is often used is hexachloroplatinic acid, dissolved in a suitable solvent, e.g., in ether glycol or isopropanol. Suitable catalysts are also the reaction products of noble metal chlorides with organic or silicone organic compounds containing vinyl groups or noble metals in very finely divided distribution on suitable carriers such as active carbon or aluminum oxide.

Condensation linking siloxanes have easily separable radicals bonded directly on siloxanes, such as hydroxyl-, alkoxy-, acyloxy-, ketoximino-, amino-, aminoxy-, or alkylamid groups or hydrogen. These cleavable or separable radicals can be arranged in turn in the polyorganosiloxanes and/or in special siloxanes added for the crosslinking. Condensation crosslinking polysiloxane elastomers which are often used consist of polydimethylsiloxanes with hydroxyl end groups and tri- or tetra-organooxysilanes added as crosslinking members, such as methyltriacetoxysilane, tetraethoxysilane, methyltris-(methylethylketoximino)-silane or polymethyl hydrogen siloxane. The use of condensation catalysts is not absolutely required in this case, but can be recommended, if the life of the crosslinking reaction is to be shortened or the temperature required for the crosslinking is to be lowered. Organic heavy metal salts are the best catalyst, such as for instance known octoates, laurates, naphthenates or acetates of tin, zirconium, lead and titanium.

These crosslinking methods known for the production of siloxane elastomers can be extended by such binding reactions as can cause the three-dimensional crosslinking of the linear polyorganosiloxane molecules. The reactive groups required for such binding reactions can be not only, as was described for the known addition and condensation crosslinking, bounded directly to the polysiloxane main chain, but also can be connected with the organic radicals R, R' or R'' of the aforementioned formulas (1) and (2) or can be identical with the other aforementioned functional groups, with which these radicals can be substituted. Examples for this are on the one hand the bonding reactions between epoxy functional radicals and on the other hand amino-, carboxyl- or carboxcylic acic anhydride-functional radicals.

It is here again to be emphasized that to attain the purpose of the invention, the type of bonding is not essential, but that any type of bonding is suitable, wherein are formed essentially only three-dimensional crosslinked polyorganosiloxanes, of which the density of crosslinking in turn is sufficiently low to impart elastomeric and not hard properties to the crosslinking product, and on the other hand is sufficiently high that the crosslinking product has a minimum of rubber-elastic properties.

The average particle size of the polyorganosiloxane-rubber particles and the particle distribution exercise an influence on the qualities of the hardened modified reaction resin, especially on its fracture and impact resistance. Therefore, it is important in obtaining the desired results according to the invention that the particle size always be within a predetermined size range, and a better effect is obtained, when instead of a very narrow ("uni-modal"), a broad distribution of the particle sizes, in other words over the entire preferred range of from 0.1 to 5 micrometers, is used. The particle size distribution can be characterized by a continuous diameter distribution curve which is a sort of a Gauss distribution curve, which, however, can also be composed of two or three base classes with narrow size distribution ("bi- or tri-modal").

The desired particle size distribution of the crosslinked polyorganosiloxane rubber particles which are found in the reaction resin matrix can be predetermined during the dispersion process with the formation of the uncrosslinked polyorganosiloxane droplets by the selection of the shearing forces and likewise the dispersion agent and are controlled within wide limits, which is familiar to the operator knowing the art of dispersion production. Naturally, note should then be taken that the particle size distribution obtained with the dispersion remains essentially unchanged with the following steps, especially during crosslinking of the polyorganosiloxanes and with hardening of the reaction resins. However, it is also possible and hardly influences the results of the invention, if a portion of the particles formed during the dispersion are coagulated or agglomerated in the following steps of the process, i.e., connected to the particles with larger diameters. Thus, particles are normally formed of different classes of sizes, whereupon the aforementioned desirable bior tri-modal size distribution can also occur.

As explained, to obtain an improved fracture and impact resistance to the hardened modified reaction resins according to the invention it is essential that the finely divided polysiloxane rubber particles have a chemical bonding with the reaction resin. The bonding is advantageously caused by a chemical reaction between reactive groups located on the surface of the rubber particles and corresponding reactive groups present in the reaction resin, and the reactive groups found on the surfaces of the polysiloxane particles of course must be synchronized with the reactive groups of the relevant reaction resin. The bonding is advantageously caused by a chemical reaction between reactive groups located on the surface of the rubber particles and corresponding reactive groups present in the reaction resin, and the reactive groups found on the surfaces of the polysiloxane particles must be fitted to the reactive groups of the relevant reaction resin. When the reaction resin is a resin hardened according to the principle of polymerization, e.g., an unsaturated polyester resin, generally polymerizable C=C-double bonds are to be selected as reactive groups in the polyorganosiloxane rubber. With an addition crosslinking resin, e.g., an epoxy resin, the reactive groups of the polysiloxane particles can likewise be epoxy groups, which then react during the hardening process of the reaction resin with the relevant used hardener, or else epoxy-reactive groups, such as the aforementioned amino-, carboxyl- or carbonic acid anhydride groups. With condensation crosslinking resins, for instance a phenol resin, the reactive groups can be for example phenolic OH groups.

So that the polyorganosiloxane rubber particles can react chemically with the reaction resin, the reactive groups must be located on the surfaces of the polyorganosiloxane rubber particles. That can, for example, be realized so that the R, R' or R" radicals contained in the polyorganosiloxane carry corresponding reactive components, as has already been described. The prerequisite for this is that these components do not influence the crosslinking reaction of the polyorganosiloxanes in an undesirable manner. Another possibility resides in the corresponding, at least partial, substitution of the dispersant which may be used in the dispersion of the polyorganosiloxanes with the desired or required reactive groups. With the process according to the invention, this can be realized in an especially simple manner in that with the selection of a suitable amphiphilic synthesized dispersant, care must be taken that its organic carbon component includes suitable reactive groups. In one preferred configuration of the process according to the invention, then a dispersant agent is used with an organic carbon component, which, has reactive groups, which in stage (c) as reactive component can cause chemical bonds between the polyorganosiloxane particles and the reaction resin or reaction resin mixture.

Another embodiment is the use in stage (c) of additives to the process according to the invention serving as reactive component. In order to assure the required chemical bonding of the silicone rubber particles to the resin marix, such a rective component must also have chemical groupings, which bond it to the silicone rubber particles. In stage (c) of the process according to the invention, preferably organoalkyl-oxysilanes and/or organo-silicone-copolymers with reactive groups adapted to the polyorganosiloxanes and reaction resins are preferably used as such reactive component between polyorganosiloxane rubber particles and reaction resin. Suitable organoalkyloxysilanes are for instance vinyl trimethoxysilane, glycidyl oxypropyltrimethoxysilane, aminopropyltriethoxysilane, methacryloyloxypropyltrimethoxysilane and so forth. Organo-silicone-copolymers, which are suitable for this purpose, could be constructed in a similar way as the aforementioned and described dispersant agents, so that another explanation is not necessary. Examples of suitable organosilicone-copolymers are condensation products of low molecular silanol-terminated polydimethylsiloxanes with diglycidylethers, hydroxycarbonic acid and polyesters containing hydroxyl- and carbonic acid groups, aromatic polyhydroxyl compounds and so forth. Other possibilities arise from the hydrosilylation of polymethylhydrogen siloxanes with compounds which in addition to the desired reactive groups also contain an olefinic double bond, such as allyl glycidyl ether, allyl alcohol, methacrylic acid allyl ester, 2-hydroxy ethyl acrylate, maleic acid anhydride and the like. he production of these copolymers is known in principle and is familiar to the person in the art.

The reaction with which the polyorganosiloxane rubber particles are to be chemically bonded to the reaction resin matrix is generally executed before or during the later processing of the modified reaction resin, and the type and conditions of the execution depend essentially upon the type of cooperating reaction components. In the simplest case, a suitable temperature increase suffices to cause the desired reaction. Another possibility resides in the addition of suitable components to the reaction with the reactive groups of the polysiloxane particles, for instance the aforementioned reactive component, or catalyzing components for this reaction in the reaction resin. For this, the added reaction components or the catalytic components can be identical with the corresponding components, which cause the hardening reaction of the reaction resin. In this case, the chemical bonding reaction is preferably not executed until the reaction resin is to be hardened according to the shaping process, occurring simultaneously with this hardening.

The modified reaction resins according to the present invention have a series of advantages as compared with the similar known products and could therefore be used for numerous different purposes. these advantages include first of all the improvement of the fracture and impact resistance of thermosetting plastics, and actually both with very low temperatures — according to the polyorganosiloxane which is used, down to $-50°$ C. — and also with very high temperatures, i.e., up to the softening temperature of the relevant thermosetting plastics. It is also important that the modifying process incur no negative influence on the hardness, the strength and softening temperature of the crosslinked reaction resin. The reaction resin hardened according to the invention by the elastomeric components has high aging, weathering, light and temperature resistance, without negatively influencing the characteristic properties of the thermosetting plastics. Also and above all, the electrical properties, especially the insulation properties of the reaction resin, are not influenced in a negative manner at high temperatures.

The processing of the reaction resins which are modified relative to impact resistance can occur in a traditional manner, in which it is especially advantageous that the viscosity of the uncrosslinked modified reaction resins is hardly higher with the preferred rubber concentrations of from 5 to 20% by weight, as compared with the modified hardened resin, than that of the unmodified resins. Also, no negative influence of the hardening reaction can normally be found by the presence of the polysiloxane particles, which is a great simplification with the final formulation of the resin and its processing. Because of the only slight influence of the modification suggested according to the invention on the processing and hardening properties, the reaction resins modified according to the invention are suitable for all additive uses, in which thermosetting plastics are traditionally used. They are additionally especially suitable for such uses in which pure thermosetting plastics could not be used until this time on account of their poor fracture and impact resistance. Suitable uses of the reaction resins modified according to the invention are especially the use for the production of fracture and impact resistant, also shaped thermosetting plastics, fiber-reinforced plastics, insulation materials in electrotechnology and laminated plastics.

The invention is now to be further explained relative to the following examples, without thereby limiting their scope in any pay. All given parts and percentage proportions are by weight, if not otherwise indicated.

EXAMPLE 1

Production of a Modified Unsaturated Polyester Resin 100 parts of a commercial unsaturated polyester resin with a styrene content of 35% and a viscosity of 650 mPa.s at 20° C. (Palatal 4P, BASF) are mixed thoroughly at 20° C. with a mixture of crosslinkable polyorganosiloxanes of the following composition:
14 parts alpha, omega-dihydroxy polydimethyl siloxane, viscosity 200 mPa.s at 20° C.,
1 part alpha, omega-di(trimethyl silyl) polymethyl hydrogen siloxane, viscosity 27 mPa.s at 20° C. (hereinafter indicated as H-siloxane),
0.1 part dibutyl tin dilaurate
3 parts of a condensation product of 70% alpha, omega-dihydroxy polymethyl phenyl siloxane, viscosity 80 mPa.s at 20° C., and 30% bisphenol-A-monoacryl acid ester.

The mixture was dispersed for 30 minutes with an "Ultra-Turrax" disperser, and the temperature rose from 25 to 50° C. The white emulsion which was obtained was then stirred lightly for another 120 minutes at approximately 80° C.

The white, smooth dispersion of crosslinked polyorganosilicone rubber in unsaturated polyester resin which was obtained in this manner was hardened by the addition of 2 parts commercial cyclohexanon peroxide paste with 0.2 parts cobalt accelerator (Luchem CS, Luperox) to 100 parts of modified polyester resin at room temperature.

An electron microscope examination of the fracture surface of the hardened product showed that the various sizes of the silicon rubber particles were distributed continuously between approximately 0.5 and 1.5 micrometers. Also at that point where the fracture surface ran through a rubber particle, it was clear that a tight bonding was present between particles and resin matrix.

Different measurements for the characteristic features of the capacity for usefulness of the hardened polyester resin as a thermosetting plastic were performed. The same measurements were also undertaken on a sample of the unmodified polyester resin which was hardened in the same manner. The results are indicated in the following Table 1:

TABLE 1

| Property | Test Specification | Unit | Resin Modif. | Resin Unmodif. |
|---|---|---|---|---|
| Impact resistance | DIN 53453 | kJ/m 2 | 35 | 11 |
| Heat deflection temperature | DIN 53458 | °C. | 56 | 55 |
| Modulus of elasticity | DIN 53457 | N/mm 2 | 3300 | 3500 |
| Flex resistance | DIN 53452 | N/mm 2 | 130 | 100 |
| Tear resistance | DIN 53455 | N/mm 2 | 69 | 72 |

Results of the testing show that the impact resistance of the resin which is modified according to the invention is improved by more than three times over that of the unmodified resin (cf. comparison example) with only minimal changes of the other tested essential properties.

In order to indicate the quality improvements of the modified resin used as a glass fiber laminate, a glass fiber mat was saturated with the resin and catalyst, so that the glass fiber portion was 25% of the laminate. The following mechanical properties of this material were measured, once again in comparison with the unmodified resin:

TABLE 2

| Property | Unit | Modified Resin | Unmodified Resin |
|---|---|---|---|
| Impact resistance | kJ/m 2 | 148 | 110 |
| Modulus of elasticity | N/mm 2 | 9750 | 10100 |
| Flex resistance | N/mm 2 | 165 | 145 |
| Tear resistance | N/mm 2 | 85 | 85 |

Also in this case improvements of the impact resistance were attained without abandoning other important material properties.

EXAMPLE 2

Production of a Modified Vinyl Ester Resin 100 parts of a commercial vinyl ester resin with a viscosity of 430 mPa.s at 20° C. and a styrene content of 40% (Palatal A 430, BASF) was mixed thoroughly at 20° C. with a mixture of crosslinkable polyorganosiloxanes of the following composition:

14 parts alpha, omega-dihydroxypolydimethyl siloxane, viscosity 1700 mPa.s at 20° C.,
1 part H-siloxane (as in Example 1),
0.1 part dibutyl tin dilaurate,
2 parts of a hydrosilylization product of: 80% bisphenol-A-monoacryl acid ester, and 20% H-siloxane (as in Example 1).

The mixture was dispered for 30 minutes with an Ultra-Turrax dispersion device, and the temperature rose from 25 to 50° C. Then it was heated further to 80° C. with slow stirring and was held at this temperature for three hours. Approximately 30 minutes after the beginning of this holding period, three parts of vinyl trimethoxyl silane were added. A white, smooth dispersion was obtained. The hardening occurred at room temperature with one part methyl ethyl ketone peroxide and 0.5 part of the cobalt accelerator from Example 1.

The particle size distribution determined in the same manner as Example 1 was between 0.3 and 1.2 micrometers.

The measurements of the mechanical properties showed the results recorded in Table 3, once again in comparison with the unmodified test bodies produced in an identical manner:

TABLE 3

| Property | Test Specification | Unit | Resin Modif. | Resin Unmodif. |
| --- | --- | --- | --- | --- |
| Impact resistance | DIN 53453 | kJ/m 2 | 112 | 43 |
| Heat deflection temperature | DIN 53458 | °C. | 101 | 105 |
| Modulus of elasticity | DIN 53457 | N/mm 2 | 4100 | 4120 |
| Flex resistance | DIN 53452 | N/mm 2 | 185 | 155 |
| Tear resistance | DIN 53455 | N/mm 2 | 90 | 88 |

The results show that the impact resistance of the hardened resin modified according to the invention is two and one half times better than that of the comparison example of unmodified resin with otherwise essentially unchanged properties of the thermosetting plastic.

EXAMPLE 3

Production of a Modified Bis-Maleimide Resin 100 parts of a commercial bis-maleimide resin which is solid at room temperature (Compimide 183, Technochemie) and 50 parts methyl glycol acetate were heated to a temperature of 80° C. with stirring and were mixed thoroughly, and a solution was formed with a viscosity of approximately 800mPa.s. This solution was mixed thoroughly with a mixture of crosslinkable polyorganosiloxanes of the following composition:

19 parts alpha,omega-divinyl polydimethyl siloxane, with viscosity of 700 mPa.s at 20° C.
1 part H-siloxane (as in Example 1),
0.1 part of a 1% solution of hexachloroplatinic acid in 2-propanol,
4 parts of a condensation product of: 50% alpha,omega-dihydroxyl polydimethylsiloxane with a viscosimetrically determined molecular weight of 1450, in which 3 mole-% of the methyl groups are replaced by vinyl groups, and 50of an alpha-allyloxy-omega-hydroxy polyether, consisting of 75 mole-% propylene glycol and 25 mole-% ethylene glycol units, with an average molecular weight of 1300.

This mixture was dispersed for 10 minutes with an Ultra-Turrax dispersing device, and the temperature rose from 80 to 110° C. This temperature was then maintained for more than 120 minutes with slow stirring.

A yellowish, smooth dispersion was obtained, which was mixed with 0.5 parts diazobicylooctane as a hardening catalyst.

Then the solvent was distilled out for the most part under a vacuum and at 80° C. The result was a viscous elastically modified already reacted bis-maleimide resin, which hardened at temperatures about 150° C. into a hard, tough and very temperature-stable duromer. The particle size distribution of the rubber particles was 0.5 to 3.3 micrometers.

To determine the characteristics of the toughening not the impact resistance, but rather the fracture energy was determined on this relatively brittle resin with great precision; the fracture energy was measured on a rod of 76×13×6.5 mm notched on one side. Three important properties of the thermosetting plastics were also measured; the results are shown in Table 4:

TABLE 4

| Property | Unit | Modified Resin | Unmodified Resin |
| --- | --- | --- | --- |
| Fracture energy | J/m 2 | 1200 | 180 |
| Modulus of elasticity | N/mm 2 | 3850 | 4100 |
| Flex resistance | N/mm 2 | 90 | 100 |
| Maximum elongation | % | 3 | 3 |

The elongation fracture energy of the hardened reaction resin, modified according to the invention, is more than six and one half times greater than that of the corresponding unmodified reaction resin, while the other characteristic features for thermosetting plastics differ only unessentially.

EXAMPLE 4

Production of a Modified Epoxy Risin 100 parts of a commercial epoxy resin with a viscosity of 10,500 mPa.s at 20° C. and an epoxy equivalent weight of 182 (Epicote 828, Shell) were mixed thoroughly at a temperature of 50° C. with a mixture of crosslinkable polyorganosiloxanes of the following composition:

57 parts alpha,omega-divinyl polydimethyl siloxane, viscosity 700 mPa.s at 20°C., p0 3 parts H-siloxane (as in EXAMPLE 1),
0.3 parts of a 1% solution of hexachloro phalimic acid n 2-proposal
6 parts of a hydrosilylization product of 40% of a silicone copolymer of 75% dimethylsiloxane - and 25% methyl hydrogensiloxane units with trimethylsilyl end groups, viscosity 120 mPa.s at 20° C., and 60% of an epoxidated allyl alcohol with 10 moles ethylene oxide,
6 parts of a hydrosilylization product of 50% H-siloxane (as in Example 1) and 50% allylglycidyl ether.

This mixture was dispersed for 15 minutes with an Ultra-Turrax dispersing device, and the temperature rose from 50 to 80° C. Then it was heated again until it reached 110° C. and held at this temperature with slow stirring for 120 minutes. A smooth, white dispersion of silicone-rubber in epoxy resin was then obtained, with a viscosity of 45,000 mPa.s at 20° C. and a particle size distribution of 0.25 to 2.4 micrometers, determined after the hardening in the manner described above.

COMPARISON EXAMPLE 4A

Production of a Rubber-Modified Epoxy Resin According to the State of the Art 100 parts of the epoxy resin of Example 4 were mixed thoroughly with 67 parts of a commercial liquid acrylonitrile-butadiene rubber terminated with a carboxyl group (Hycar 1300×8, B.F. Goodrich), 0.25 parts triphenyl phosphine were added and the entire mixture was held at 100° C. for three hours. Then the acid number was lowered to below 0.1, which means that the conversion of the carboxyl groups with the epoxy resin was practically completed. A clear, highly viscous liquid with a viscosity of 185,000 mPa.s at 20° C. was obtained.

Two series of tests were performed with the modified epoxy resins of Examples 4 and 4a, with varying amounts of rubber in the epoxy resin in each test. For this purpose, the modified resins were adjusted by addition of unmodified resin to reach the desired rubber content. The resins were hardened by means of an acid anhydride hardener used for the production of temperature-stable epoxy resins (Lindride 22, Shell) with addition of 1 phr 2,4,6-tri(dimethylaminomethyl)phenol as catalyst at 120° C. The results are shown in Table 5.

TABLE 5

| Test No. | Rubber in Final Product (%) | Modulus of elasticity (N/mm$^2$) | Tear Resistance (N/mm$^2$) | Fracture energy (kJ/m$^2$) | Martens Temp. (°C.) |
|---|---|---|---|---|---|
| 4/0 (Comparison) | 0 | 2950 | 70 | 2 | 112 |
| 4/1 | 5 | 2950 | 66 | 10 | 112 |
| 4/2 | 10 | 2900 | 65 | 21 | 112 |
| 4/3 | 15 | 2860 | 62 | 26 | 110 |
| 4a/1 (Comparison) | 5 | 2760 | 65 | 12 | 111 |
| 4a/2 (Comparison) | 10 | 2350 | 59 | 18 | 108 |
| 4a/3 (Comparison) | 15 | 2240 | 51 | 21 | 102 |

The results clearly show that the modification according to the invention makes the product superior to the state of the art relative to the improvement of the fracture energy, without any drawback relative to the minimization of other advantageous properties.

EXAMPLE 5

Production of a Modified Epoxy Resin and its Use in a Glass Fiber Laminate 50 parts of the unmodified epoxy resin of Example 4 were mixed thoroughly at 70° C. with 50 parts of a commercial epoxy-novolak resin which was semisolid at room temperature (Epikote 155, Shell). Then at this temperature, a mixture of crosslinkable polyorganosiloxanes of the following composition was added:
9.5 parts alpha,omega-dihydroxyl polydimethyl siloxane, viscosity 2400 mPa.s at 20° C.,
0.5 parts tetraethoxysilane,
0.01 part dibutyl tin laurate,
1 part of an addition product of: 75% alpha,omega-dihydroxyl polymethyl phenylsiloxane, viscosity 80 mPa.s at 20° C., and 25% bisphenol-A-diglycidyl ether.

This mixture was homogenized for 10 minutes with an Ultra-Turrax dispersing device, and the temperature rose from 70 to 95°C. Then 1.1 parts glycidyl oxypropyl trimethoxysilane were added as reaction component and the total mixture was held for approximately 120 minutes at 100° C. with slow stirring. A highly viscous, white emulsion was obtained, which was semisolid at room temperature.

The particle size distribution evaluated on a hardened sample was bimodal with maximums at 0.45 and at 2 micrometers.

Comparison Example 5a

Example 5 was repeated with the difference that no glycidyl oxypropyltrimethoxysilane was added. The product which was obtained did not differ outwardly from the product of Example 5 according to the invention.

In the comparison of electron microscopic recordings of the fracture surfaces of the hardened resins, however, it was shown that the silicone rubber articles in the resin of Comparison Example 5a as compared with those of the resin of Example 5 according to the invention had no bonding whatsoever to the resin matrix and were simply in part deleted from the surface of the fragments, which was clearly detectable by the holes which remained in the resin material.

The modified resins which were produced according to Examples 5 and 5a were subjected to a comparison testing for determination of their influence on the properties of glass fiber laminates produced from them.

For that, the modified resins were mixed with equivalent quantities of methylene bis-aniline as hardener and then saturated at 60° C. with a glass fiber mat, which was then hardened for two hours at 100° C. The resin content in the laminate was 35%. The values recorded in the following Table 6 show that the interlaminar fracture energy measured as a critical measure is greatly improved by the use of a reactive component according to the invention.

TABLE 6

| | | Glass Fiber Laminate With | |
|---|---|---|---|
| Property | Unit | Modified Resin With Catalyst | Modified Resin Without Catalyst |
| Fracture energy | J/m 2 | 4900 | 1200 |
| Modulus of elasticity | N/mm 2 | 28500 | 30100 |

What is claimed is:
1. Modified theromosetting resin, comprising:
 (a) 50-98% by weight of a thermosetting resin or a mixture of thermosetting resins being crosslinkable by polyaddition or polycondensaion polymerization and processible into thermosetting plastics, said thermosetting resin or mixture of thermosetting resins being liquid at temperatures in the range of from 18 to 120° C. and having an average molecular weight of form 200to 500,000; and
 (b) 2-50% by weight of one or more three-dimensional crosslinked polyorganosiloxane rubbers, which are present in the reaction thermosetting resin or mixture of thermosetting resins in finely divided form as polyorganosiloxsane rubber parti- cles having a diameter of from 0.01 to 50 micrometers, the rubber particles selected from the group consisting of those having the following generally formula of silioxane units:

—(R₂ SiO)— (1)

in which both monovalent R radicals, which are identical or different, are linear or branched alkyl groups with 1 to 18 C atoms, cycloaliphatic groups with 4 to 8 C atoms, linear or branched alkenyl groups with 2 to 4 C atoms, phenyl or alkylphenyl groups with 1 to 12 C atoms in the aliphatic radical, and the hydrocarbon radicals can be substituted by hydrogen, halogen, hydroxyl-, carboxyl, carboxylic acid anhydride-, amino-, epoxy-, alkoxy-, alkenyl oxy-, polyether- or polyolefine groups, said groups being connected directly or through an oxygen or nitrogen atom with a silicon atom of the polysilixane chain.

2. Modified thermosetting resin as defined in claim 1, wherein the thermosetting resin to be modified consists of epoxy-, urethane-, or air-drying alkyd resins or a mixture theroef.

3. Modified thermosetting resin as defined in claim 1, wherein the theromosetting resin to be modified consists of phenol-, resorcinol- or cresol resins, urea-formaldehyde- or melamine-formaldehyde-precondensates, furan resins, saturated polyester resins or silicone resins or a mixture thereof.

4. Modified thermosetting resin as defined in claim 1, wherein the th ⓡromosetting resin to be modified consists of one or more homo- or copolymers of acrylic acid and/or methacrylic acid or their esters.

5. Modified thermosetting resin as defined in claim 1, where in the thermosetting resin to be modified consists of one or more unsaturated polyester resins or bismaleimide resins or a mixture thereof.

6. Modified thermosetting resin as defined in claim 1, where in the thermosetting resin or mixture of thermosetting resins to be modified has an average molecular weight of from 300 to 20,000.

7. Modified thermosetting resin as defined in claim 1, wherein each R is a polyether radical selected from the group consisting of polyethylene glycol, polypropylene glycol, polybutylene glycol, polyhexamethylene glycol, polytetrahydrofuran and copolymers of these ethers, and polyolefine radicals selected from the group consisting of polybutadiene, polyisoprene, polybutene and polyisobutene.

8. Modified thermosetting resin as defined in claim 1, wherein the polyorganosiloxane rubber particles dispersed in the theromosetting resin have a diameter in the range of from 0.05 to 20 micrometers.

9. Modified thermosetting resin as defined in claim 1, wherein the polyorganosiloxane rubber particles dispersed in the thermosetting resin have a diameter in the range of from 0.1 to 5 micrometers.

10. A fracture and impact resistant molded object comprising the modified thermosetting resin defined by claim 1.

11. A modified thermosetting resin as defined by claim 1, additionally containing a dispersant with an average molecular weight of from 300–50,000 being able to stablize the polyorgasnosiloxane rubber particles dispersed in the thermosetting resin or mixture of thermosetting resins and being compatible with the polyorganosiloxanes and thermosetting resins or mixture of thermosetting resins.

12. Modifed thermosetting resin as defined in claim 11, wherein the dispersants are present in an amount of 1 to 30% by weight based on the polyorganosiloxane proportion.

13. Process for the production of modified thermosetting resins as defined in claim 11, which comprises
dispersing 2 to 50% by weight of one or more three-dimensional crosslinkable, liquid polorganosiloxanes with an average molecular weight of from 800 to 500,000 in the presence of a crosslinking catalyst and/or a crosslinking agent in 50 to 98% by weight of a thermosetting resin or mixture of theromosetting resins being liquid at temperatures in the range of from 18 to 120? C. and having an average molecular weight of from 200 to 500,000 and, optionally, dispersants having an average molecular weight of from 300 to 50,000 being able to stablize the oplyorganosiloxane rubber particles to be dispersed in the thermosetting resin or mixture of thermosetting resins and being compatible with the polyorganosiloxanes and thermosetting resin or mixture of thermosetting resins, by using mechanical equipment effecting high ⓡh ⓡar fcrces in the medium to be dispersed or ultrasonic homogenizers which result in a fine distribution of the liquid polyorganosilonxanes in the liquid thermosetting resin or mixture of theromosetting resins, forming polyorganosiloxane droplets with a diameter in the range of from 0.01 to 50 micrometers.

14. Process as defined in claim 13, wherein 5 to 30% by weight of one or more three-dimensional crosslinkable, liquid polyorganosiloxanes are used in stage (a).

15. Process as defined in claim 13, wherein the crosslinkable polyorganosiloxane or polyoragnosiloxane mixture in stage (a) has an average molecular weight of 1000 to 100,000.

16. Process as defined in claim 13, wherein the crosslinkable polyorganosiloxane or polyorganosiloxane mixture in stage (a) has an average molecular weight: of 1200 to 30,000.

17. Process as defined in claim 13, wherein the one or more three-dimensional crosslinkable liquid polyorganosiloxanes are dispersed in a dispersion medium, the resulting dispersion is mixed thoroughly with the thermosetting resin or mixture of thermosetting resins, whereby the dispersion medium remains in the resulting dispersion or is removed from the resulting dispersion in a suitable manner.

18. Process as defined in claim 17, wherein water is used as dispersion medium.

19. Process as defined in claim 13 wherein the one or more liquid plyorganosiloxnaes to be dispersed are of such a tube in which more than 50% of all of the organic groups of the siloxane main chain are methyl groups.

20. Modified reaction resin as defined in claim 7, wherein the polyorganosiloxane rubber is a copolymer block, in which monovalent R, and R″ radicals are arranged along the siloxane main chain in blocks, whioh derive from polymers of the following general formula:

—(R'₂SiO)ₓ—(R″₂SiO)ᵧ× (2)

in which the R' and R″ radicals, which have the same meaning as R, are different from each other, while the R' and R″ radicals can be identical or different from each other, and x and y are equal to 1 or whole number multiples thereof.

21. Modified reaction, resin as defined in claim 20 where at least 50% of the R, R' and R″ radicals are methyl and/or phenyl groups.

* * * * *